8567X
A. L. Brook,
Wood Planing Machine.
Patented Jan. 7, 1835.
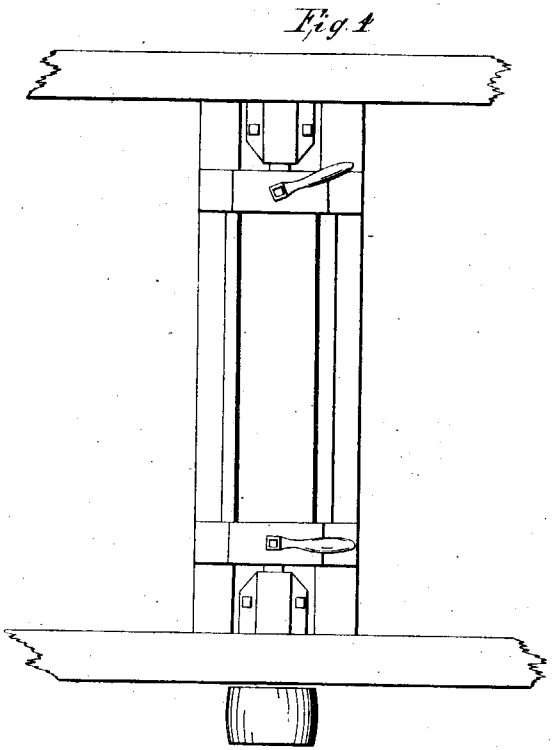
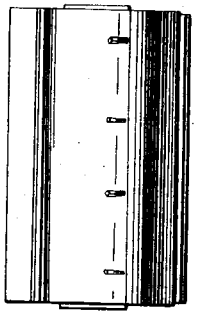
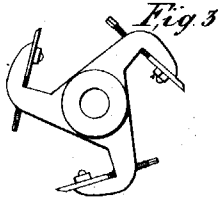
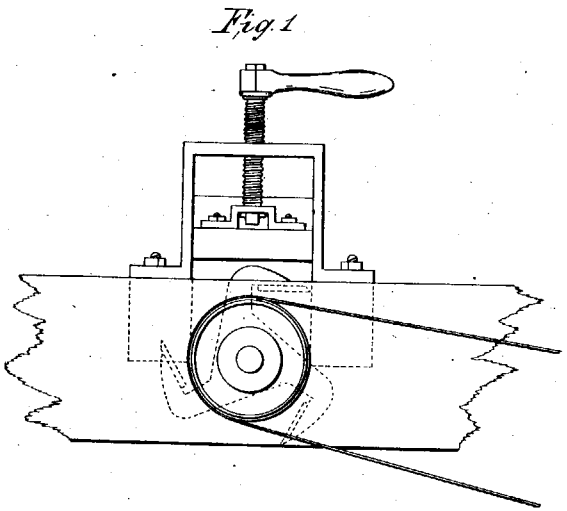
A.M. PHOTO-LITHO. CO. N.Y. (OSBORNE'S PROCESS)

Artemas L. Brooks Lowell, Mass.

Letters Patent dated Jany. 7. 1895.

The Schedule referred to in these Letters Patent and making part of the same containing a description in the words of the said Artemas L. Brooks himself of his improvement on the machine for planing boards patented by William Woodworth To all Whom it may Concern.

Be it known that Artemas L. Brooks of Lowell in the County of Middlesex and Commonwealth of Massachusetts have invented a new and useful improvement in the machine patented by William Woodworth for planing tongueing and grooving boards &c on the 29 day of Decemb. 1825 and I do hereby declare that the following is a full and exact description of my said improvement In the machine as patented by Woodworth one side only of a board or plank could be planed at once which in many cases is all that is nefsary; there are others however as in boards for packing boxes partitions and various other purposes, it is nefsary that both sides should be planed. To effect this I employ a second rotary cutting wheel made in all respects like that already in use in the said machine, but so placed that it may operate on the under side of the board opposite to that on which the first cutter wheel acts.

This second cutter wheel I fix in a frame adjustable by screws wedges or otherwise so that it may be adjusted to the thickness of the stuff to be planed The mode of working the machine so as to advance the board against the cutters is to be the same with that already followed, All that I claim as my improvement being the employment of two cutter wheels for the purpose of planing both sides of a board or plank at the same time in the manner herein before set forth, employing a double belt or any other convenient mode for giving motion to the said cutter wheels Witnesses
[illegible] P. [illegible]
Nehemiah P. [illegible]

Artemas L. Brooks.

290 wds.

(Drawing)